United States Patent [19]

Green, Jr. et al.

[11] 4,361,890

[45] Nov. 30, 1982

[54] SYNCHRONIZING SYSTEM

[75] Inventors: James H. Green, Jr.; Madison G. Nicholson, Jr., both of Snyder, N.Y.

[73] Assignee: GTE Products Corporation, Stamford, Conn.

[21] Appl. No.: 744,034

[22] Filed: Jun. 17, 1958

[51] Int. Cl.³ .............................................. H04L 9/00
[52] U.S. Cl. ..................................... 375/1; 178/22.17; 375/119; 375/120; 370/106; 370/108
[58] Field of Search ...................... 250/6.6, 9 S, 20.41; 178/43.5, 22.17; 179/1.5, 15.5, 15.6, 15; 340/349, 351, 147 SY; 235/181, 121; 343/100.7, 100 CL; 325/32; 371/1, 111, 118, 119, 120, 106, 108, 25, 96; 364/728, 604, 819; 370/106, 108, 12; 367/41

[56] References Cited

U.S. PATENT DOCUMENTS 2,506,766 5/1950 Bartelink ...................... 340/147 SY
2,570,775 10/1951 De Baun ............................ 358/149
2,610,297 9/1952 Leed .
2,690,558 9/1954 Harvey .................................. 343/104
3,016,519 1/1962 Lindner .

OTHER PUBLICATIONS

IEEE Trans. on Communications, vol. Com-30, No. 5 (5/82) pp. 822-853, Origins of Spread Spectrum Communications, Robert A. Schotz.

Primary Examiner—Salvatore Cangialosi
Attorney, Agent, or Firm—Francis I. Sullivan; Peter Xiarhos

EXEMPLARY CLAIM

1. In a communication system utilizing at least two independent binary coded pulse signal sequences, means for achieving and holding time synchronism between said two sequences which comprises the combination of pulse recurrence frequency searching means for controlling the pulse recurrence frequency of one of said signals relative to the other to bring said signal into synchronism with the other, and phase locking means including a periodic phase checking circuit and a phase variation correcting circuit responsive to the searching means bringing the signals into synchronism to operate on one of said signals for holding said signals in synchronism.

12 Claims, 6 Drawing Figures

SYNCHRONIZING SYSTEM

This invention is concerned with electronic communication systems, and particularly with improved means for finding and holding signal or time synchronism between remote stations in a manner useful, for example, in carrier dispersal radio communication systems of the spread spectrum type and other frequency or pulse code synchronized networks.

In relatively basic radio communication systems, the rf carrier is generated at a precise single frequency. If the carrier is unmodulated, this is the only frequency transmitted. When, however, message signals modulate the carrier, a number of side band frequencies, occupying a bandwidth area of the rf spectrum on either side of the carrier frequency, are added. The width of the band is determined by the highest frequency component of the modulating signal.

Another type of communication utilizes a plurality of separate carrier frequencies which are each modulated with a portion of the intelligence to be transmitted. This type of frequency "sharing" or "hopping" has served useful purposes, for example, in providing separate channels for the transmission of the zeros and the ones of binary coded digital communication systems.

Recently, an improved method of radio communication has been devised wherein the energy in a radio carrier, instead of being transmitted on a single frequency or a number of discrete frequencies, is dispersed to occupy a relatively wide band of the rf spectrum. Two terms, "carrier dispersal" and "spread spectrum", are used to designate this type of communication. "Carrier dispersal", refers to the process by which the energy associated with a radio frequency carrier is dispersed or distributed over a relatively broad range of frequencies; and, "spread spectrum", characterizes the wave form which results from this process.

The principal characteristic of carrier dispersal communication techniques comprises spreading the energy of the modulated carrier over a frequency spectrum so wide (e.g. 10 megacycles) that its individual component frequencies become immersed in the background noise of the transmission channel. This prevents the communication signal from being detected except by a selectively addressed receiver and makes the power requirements for jamming prohibitive. Consequently, the system is useful for reliable, private, and undetected communication in a large number of separate links within a single band of frequencies. Typical applications are for military security purposes, and to provide private communication with a great number of separate addresses in flexible and heavily trafficked networks such as air traffic control systems.

One type of spread spectrum technique disperses the rf signal over a broad band of frequencies by modulating the carrier with a pseudo-random sequence of pulses derived from a carrier dispersal pattern code generator. The outer limits to which the carrier bandwidth is spread in both directions off its basic frequency is $F_H$ which represents the highest frequency component in the modulation signal; and the individual frequencies which comprise the wide band have a spacing of $F_L$, corresponding to the lowest frequency component of the modulation. An even spreading of the transmitted energy is achieved by providing these critical frequencies in irregular, yet substantially equal, amounts throughout the modulating signals. This is done with a coded pulse modulation wherein: the pulse width provides the band spread desired; the PRF of the code corresponds to the required spacing between the individual frequency components of the band; and, the digit sequence follows a random pattern with a statistically average distribution.

In the addressed receiver, a local code generator modulates a local oscillator separated by the IF bandwidth from the frequency of the transmitted carrier and beats the resultant output against the received signal in a correlation mixer. When the coded pattern of the frequencies locally generated corresponds to the pattern received from the transmitter, a significant IF signal is processed to the receiver output.

Prior to spreading the carrier frequency at the transmitter, and after correlation in the receiver, the transmitted energy is respectively modulated to apply, and demodulated to derive, message intelligence. Any of the conventional amplitude, frequency, phase, etc. modulation techniques suitable to the specific application of the system may be employed for this purpose.

Similarly, the method of accomplishing the frequency spreading may vary according to the intended usage of the system. The only stringent requirement of the dispersing modulation is that it be precisely known at both the transmitting and receiving stations to permit identical duplication and time synchronizing at both sites so that the receiver can reassemble the energy spread across the frequency spectrum back into a single carrier frequency.

Three principal methods for obtaining this critical synchronism are presently employed. In one method, the unmodulated carrier from the transmitter is keyed in coded bursts to provide synchronizing markers which indicates to the receiver the transmission of a dispersed signal concurrently with or at a given time displacement after the synchronizing burst. This method has the basic disadvantage that preliminary transmissions must be made with a conventional carrier. For certain applications of the system, e.g. secret communications, such transmissions are highly undesirable.

A second synchronizing method calls for a priori agreement on a starting position in a coded sequence on the basis of a precise knowledge of time available at both the transmitter and receiver. This method has two serious disadvantages. The first is extremely precise time synchronism, since the bit flow rate of the dispersal code may be at microsecond frequencies. Secondly, exact knowledge of, and adjustment for, position and distance from transmitter to receiver is required because the transit time of a signal can vary by periods equal to multiples of complete bit lengths between remote and close transmitters and receivers. This drawback is particularly serious with respect to operation in networks involving aircraft in flight.

A third synchronizing system involves adjusting the transmitter and receiver dispersal pattern generators in a closed circuit until they are operating in synchronism and then severing the connection between them. This requires relatively proximate location of transmitter and receiver before communication is initiated, and, consequently, has only limited application.

All three of the synchronizing techniques referred to have further common disadvantages. If transmission of a message is interrupted by loss of signal, synchronism of the pattern generators can be re-established only by halting the transmission and repeating the necessary synchronizing procedures. Also, while the transmission is in progress, a receiver cannot be synchronized without disrupting the communication.

Accordingly, an objective of the present invention is to provide an improved means for achieving and holding time and signal synchronism of remotely located pulse code or radio frequency generators. Another objective is to provide an improved communication system, especially of the spread spectrum type.

These and related objects are accomplished in one embodiment of the invention by providing means for causing one code generator, e.g. at a ratio receiver, to cycle through a "search" operation, wherein it aligns a local coded pulse sequence in identical phase with that of another generator; e.g. at a transmitter. Then, when alignment is achieved, the first code generator goes into a "lock" operation which maintains this synchronism despite frequency drifting, doppler shifting, etc.

In this embodiment the carrier dispersal pattern generators employed in both the transmitter and the receiver are maximum length, perfect word-generating, shift registers. Such code generators are described in a report entitled "Sequences with the Cycle-and-Add Property", by S. W. Golomb, published by the Jet Propulsion Laboratory of the California Institute of Technology, Pasadena, Calif., Dec. 19, 1957. Their so-called perfect word outputs comprise particular binary sequences of "zeros" and "ones" which, when correlated with shifted versions of themselves, provide maximum indication when they are aligned with exactly the same relationship of ones and zeros and a relatively minor correlation in all other shifted relationships. These perfect words also have the advantage, which will be referred to in more detail later, that they can, with the aid of suitable logic circuitry, be auto-generated to a sequence length of $2^n - 1$ from an n stage shift register.

Search for correlation is accomplished between the coded sequence transmitted and the one locally generated at the receiver by slightly increasing or decreasing the basic shifting frequency of the receiver code generator so that it will cycle through the production of its perfect word at a different rate than the code generator of the transmitter. This frequency shifting, in effect, slides one code past the other in the correlation mixer of the receiver. When, during this sliding process, the two codes reach a point of precise identical digit alignment, all of their various frequency and phase components become mutually additive and a relatively sizable signal is presented to the IF amplifier. This signal applies a disabling voltage to the frequency shift circuit of the receiver code generator to restore the basic shift frequency and stop the search process.

Locking the local code generator to the received signal once synchronism is attained is accomplished by: making small, rapid, forward and backward time excursions of the local modulation signal; determining if these excursions bring the mixed signals closer to or further from correlation; and, then correcting the basic clock frequency to minimize errors.

Other objectives and features of the invention will be apparent from the following more detailed description of the embodiment referred to above, and by reference to the accompanying drawings, wherein:

Figure 1:
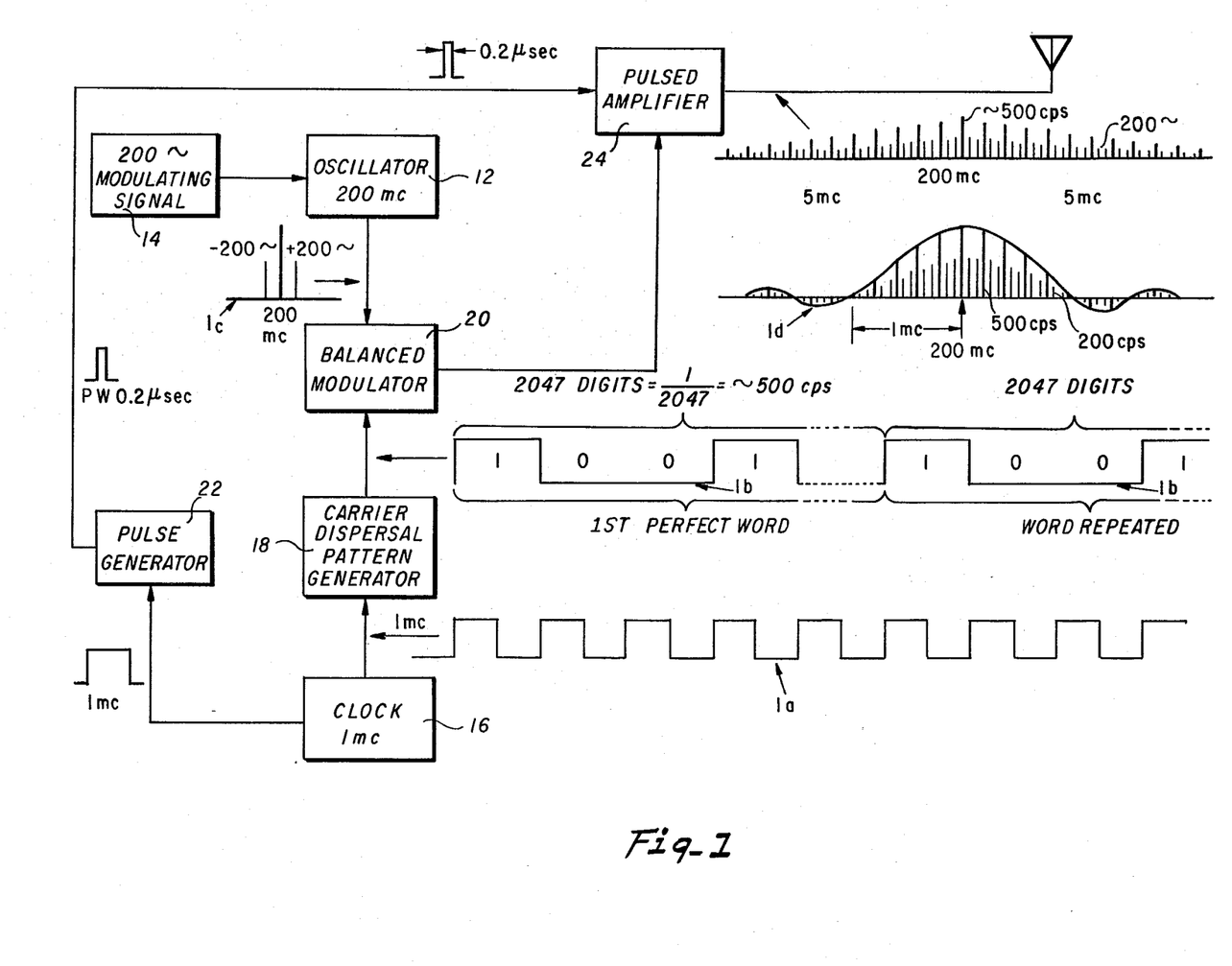
FIG. 1 is a block diagram of the transmitter portion of a carrier dispersal communication system embodying the invention.

The principal components of the transmitter shown in the block diagram of FIG. 1 are: a radio frequency oscillator 12, modulated by tone signals from a keyer 14; a basic pulse-generating clock 16 controlling the period of a carrier dispersal pattern generator 18 which modulates the signal of rf oscillator 12 in a balanced modulator 20; and a pulse generator or shaper 22 and a pulsed amplifier 24 which increase the rf carrier dispersal over that accomplished by the initial pulse code modulation.

The particulars of the carrier dispersal or frequency spreading of the signal and the operation of the transmitter will be explained in more detail below. In general, however, the transmitter may be said to broadcast a message imposed upon a radio frequency carrier which has its energy spread across so wide a frequency band that its signal becomes immersed in the background noise of the transmission channel. Because the critical frequency components of the modulation have a substantially even distribution throughout the modulation, this signal has the apparent characteristics of white noise, i.e. a random signal distribution of statistically average frequency components.

Figure 2:
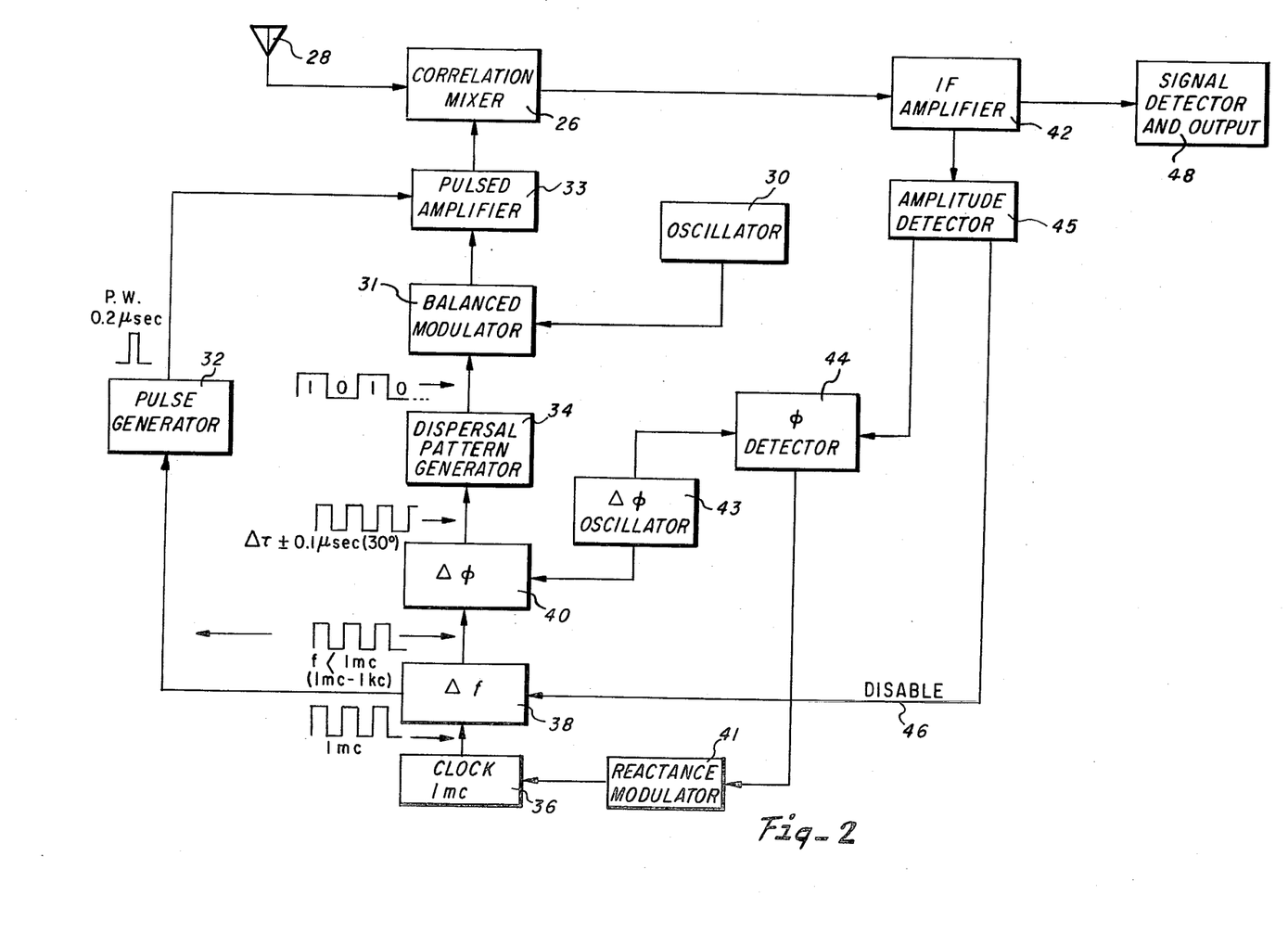
FIG. 2 is a block diagram of the receiver portion of the system.

The principal components of the receiver shown in the block diagram of FIG. 2 include: a correlation mixer 26, having as one of its inputs the signal received at antenna 28; a local oscillator 30, connected to a balanced modulator 31 which has its output pulsed by the signal from a pulse generator 32 in a pulsed amplifier 33, and provides a second input to the mixer 26; a pattern dispersal generator 34, also connected to the balanced modulator 31; a central clock 36 controlling the pattern generator 34 through a frequency shifting circuit 38 and a phase shifting circuit 40; a reactance element 41 controlling the frequency of the clock 36; an oscillator 43 controlling the period of phase shifting circuit 40; and, an intermediate frequency amplifying section 42 connected to an amplitude detector 45, the phase shift oscillator 43, through detector 45 and a disabling circuit 46 to frequency shifter 38, and to a signal detecting and output circuit 48.

Briefly, the receiver picks up, at the antenna 28, the frequency dispersed signal immersed in and not apparently distinguishable from the background noise of the transmission channel. This signal is applied to the correlation mixer 26 where it is compared with, i.e. beat against, a locally generated signal originating at oscillator 30 and modulated by pulse sequences of the same critical frequency and phase characteristics as those which modulate the transmitted carrier. The general functioning of the receiver is similar to that of a conventional superheterodyne except that coded pulsing of the signal from oscillator 30 takes the place of the conventional local oscillator and the receiver modulating code is synchronized with the transmitter code by frequency search and phase locking operations significant to this invention.

Referring to the transmitter block diagram of FIG. 1, basic timing clock 16, which may be a crystal controlled oscillator plus sufficient shaping circuitry to derive a square wave, produces a train of pulses at a frequency of 1 megacycle. These pulses are applied to the carrier dispersal pattern generator 18 which produces the so-called perfect word pulses for pseudo-random modulation to disperse the rf energy of the transmitter carrier over a broad spectrum.

Figure 3:
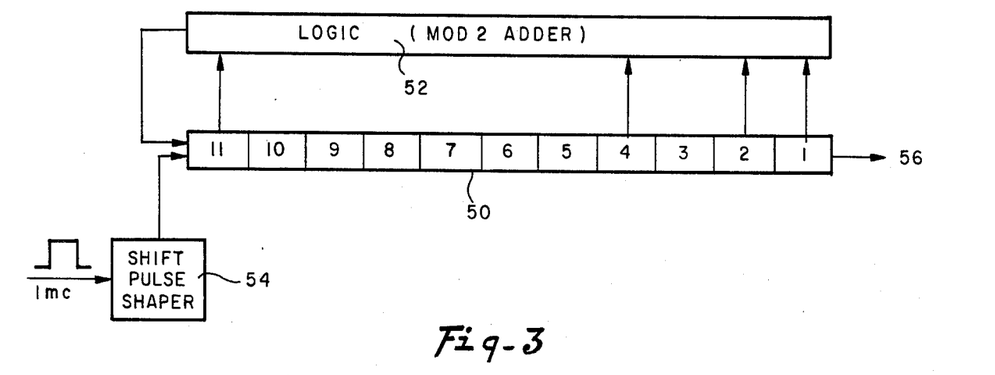
FIG. 3 is a block diagram of a carrier dispersal perfect word generator employed in both the transmitter and the receiver of the previous figures.

FIG. 3 is a more detailed diagram of the perfect word producing pattern code generator 18. As explained previously, the perfect words suitable to provide a dispersal code comprise particular binary sequences of pulses having three unique characteristics. First, they are pseudo-random in character, i.e. they are comprised of a seemingly haphazard sequence of ones and zeros (see FIG. 4) so that the component frequencies of zeros and ones are distributed on a statistical average during the carrier dispersing process.

Second, when auto-correlated with shifted versions of themselves, these sequences produce maximum indication when they are in exact digit for digit alignment and minimum indication in other versions. This characteristic may be demonstrated by adding any perfect word to all possible shifted versions of itself. In the single case of perfect alignment, the ones and zeros correspond exactly. In all other versions, there is one more disagreement than agreement in a digit by digit comparison of the two sequences. If, for example, we analyze a perfect word having a sequence of 2047 binary digits, there are 1023 instances of digit for digit identity and 1024 instances of digit for digit dissimilarity in every possible comparison except the one instance where the two words are in perfect digit-for-digit-alignment.

Figure 5:
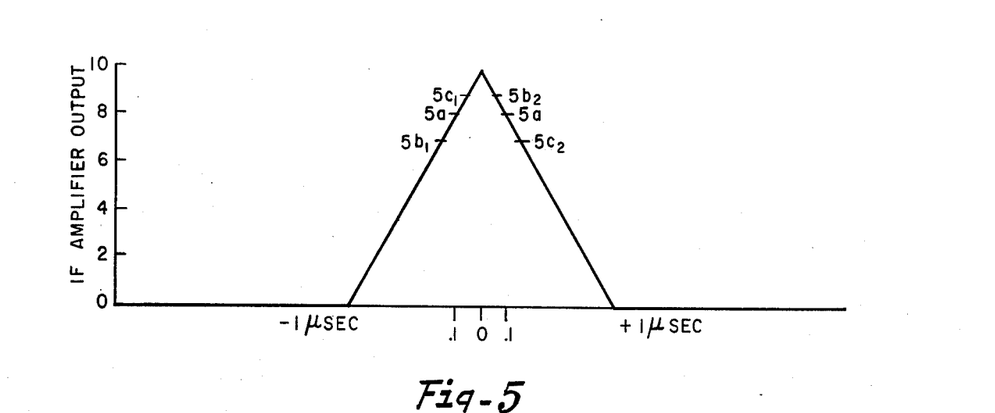
FIG. 5 is a graphic representation of the correlation signal of the perfect words generated by the device of FIG. 3; and, FIG. 6 is a diagrammatic representation of "lock" circuit control signals responsive to various degrees of pulse code correlation.
Figure 6:
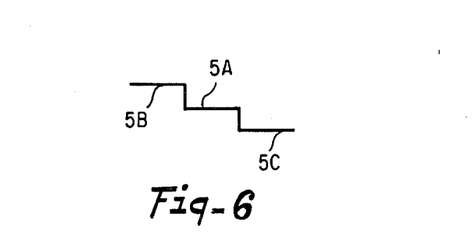

FIG. 5 demonstrates the effect of this perfect word correlation in the IF amplitude detector 45 connected to a correlation mixer comparing two signals each comprising the same basic carrier frequency pulse modulated by the same perfect word coded pattern. The words are understood to have a bit rate of 1 microsecond. With the IF set to the proper threshold sensitivity, maximum signal will be experienced when the pulse coding of the two signls is in exact digit-for-digit alignment and will be reduced to zero when the coding has shifted by a single digit in either direction from perfect alignment.

The third characteristic feature of perfect words which is of present usefulness is their capacity for auto-generation. Referring to FIG. 3, an eleven stage shift register 50 is shown with taps from the first, second, fourth, and eleventh stages to a circuit logic network 52 comprising a sum-modulo 2 adder. The output of this circuit 52 is connected to the last stage 11 of the register 50. As the register is shifted at one microsecond intervals under control of pulses from a shift pulse shaper 54, a sequence of digits may be derived from the output terminal 56 connected to the first or front end stage of the register 50.

It is characteristic of perfect words that this particular arrangement will provide what is termed a maximum length sequence. That is to say, a sequence of binary-digit-representing pulses to a length of $2^n - 1$ (where n = the number of stages in the register) may be derived at terminal 56 before the sequence commences to repeat itself. Consequently, with the particular eleven stage shifting register shown, a perfect word sequence of 2047 ($2^{11} - 1$) digits may be derived. There is no need to apply any particular initial contents to the register with the single exception that it not commence operation with a content of nothing but zeros in all stages. If any one or more of the eleven stages contains a one, the register may be driven through a cycle of 2047 shifts, and its output thereafter will be a perfect word whose format is determined by the connections to the individual stages of the register and operation of the logic circuit 52.

More detailed information concerning perfect words is available in open literature on the subject such as the publication by Golomb previously referenced. The preceding explanation of the characteristics which make them useful in this invention is adequate for present purposes.

Figure 4:
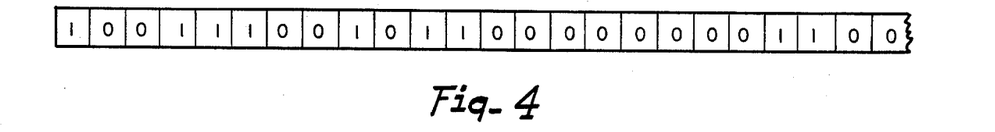
FIG. 4 is a diagrammatic representation of a portion of a perfect word sequence of pulses produced by the generator of FIG. 3.

A portion of a sample perfect word output of the carrier dispersal pattern generator 18 is shown diagrammatically at 1b and in FIG. 4. Given a 1 megacycle shifting pulse rate, the individual digits of the word may be represented by a square wave pulse format of positive levels to represent a binary one, and negative levels to represent a binary zero in the word content. The pulse width of a single digit, determined by the 1 megacycle shifting rate, is 1 microsecond; and, the frequency period of a complete word of 2047 digits is 1/2047 or approximately 500 cps. This is the pulse modulation signal applied from the dispersal pattern generator 18 to the balanced modulator 20.

The rf carrier applied to the modulator 20 comprises a basic 200 megacycle signal from the oscillator 12 amplitude modulated with the message to be communicated by a 200 cycle tone from the keying circuit 14. This amplitude modulation of the 200 megacycle carrier results in a carrier frequency spectrum of 200 megacycles having 200 cycle side bands, shown diagrammatically at 1c in FIG. 1.

The effect of pulse modulating the carrier by a perfect word with 1 megacycle pulses at a 500 cps repetitive sequence rate is the sine x/x frequency distribution shown at 1d. Balanced modulation has canceled out the 200 mc carrier and dispersed its energy over a frequency band having a first zero cross-over at 1 megacycle (1/pw, where the individual pulses have a width of one microsecond) in both directions from the 200 mc carrier. The individual spectral lines of the frequency components within the bandwidth envelope, due to the period of the perfect word, are 500 cycles apart; and, each of these 500 cycle spectral elements has individual side bands corresponding to the 200 cps amplitude modulation of the carrier. The frequency pattern of this signal is further affected by the nature of the perfect word modulation. In a typical system, modulation of the carrier by the individual component pulse digits of the perfect word is accomplished by phase reversal; i.e., the phase of the carrier is reversed 180° each time the digit sequence of the modulating word shifts from one to zero and vice versa.

The major signal output of the balanced modulator 20 as shown at 1d, is the 2 megacycle bandwidth covered by the envelope within the first cross-over. The minor cross-overs may be ignored because their energy content is small and their significance is lost in the overall bandwidth tuning of the system. Such dispersal may be sufficient for most communication purposes. If further dispersal is desired, this signal may be applied to an amplifier 24 which has its output pulsed by a signal derived from the pulse generator and shaper 22 which converts the 1 megacycle signals from clock 16 to pulses having a pulse width, pw, of 0.2 microseconds.

Pulsing the carrier at this rate spreads its energy even further across the frequency spectrum. Since the bandwidth to which a frequency is spread by pulse modulation is 1/pw, the output signal of the amplifier 24 modulated by this 0.2 microsecond pulse will be 1/0.2 µsecs., i.e. 5 megacycles, in each direction. The result is dispersal of the modulated rf energy over a 10 megacycle bandwidth in which the signal energy has been so dispersed that it becomes indistinguishable from channel noise except to a unique receiver.

In the receiver equipment, referring to FIG. 2, the rf energy dispersed over a 10 megacycle bandwidth in a complex pattern of frequencies and phase relationships is intercepted at the antenna 28 and applied to the correlation mixer 26.

As explained previously, a locally generated signal of similar frequency content is compared, or beat against, the received signal in the mixer 26. As long as the phase relationship of the various frequency components of these two signals is not additive, the threshold sensitivity of the IF amplifier 42 is not exceeded and no significant signal is introduced into the remainder of the system.

The source of the local correlation signal is the output of an oscillator 30 displaced by the 500 cycle IF spectrum from the 200 mc frequency of oscillator 12 at the transmitter, and modulated in balanced modulator 31 by a frequency dispersing pattern code generator 34. This local code generator provides a binary coded pulse sequence in the form of a perfect word identical to that produced by the dispersal code generator 18 in the transmitter.

The local carrier frequency is further modulated in pulsed amplifier 33 by a 0.2 microsecond pulse from the generator 32 similar to that derived from the generator 22 in the transmitter and having the same additional dispersing effect on the rf energy of the carrier. Thus, the two inputs to correlation mixer 26, one the received signal and the other the locally generated signal, are comprised of identical frequency components except for the 200 cycle tone amplitude modulation of the received signal representing the message intelligence to be communicated.

As explained previously, the correlation mixer will not provide a significant signal to the IF amplitude detector 45 unless the phase relationship as well as the frequency components of the received and locally generated inputs to the mixer are in correlated or additive relationship. In order to achieve this relationship, the basic frequency of the local 1 megacycle clock 36 is altered by a slight amount ($\Delta f$) so that the locally generated code will shift at a different rate than the coded modulation of the received signal. In the illustrative embodiment of the invention under description, a linear frequency modulator of the type described in co-pending U.S. patent application Ser. No. 596,350 of M. G. Nicholson, dated July 6, 1956, now U.S. Pat. No. 2,923,891, has been used for this purpose. Such a modulator has the desirable quality of shifting frequency without affecting phase.

During the frequency shifted period of comparison, the two generators must stay substantially in step for a period long enough to pass a phase identity signal through the relatively narrow band IF amplifier. In a typical system, a frequency shift of 1 kc is used for $\Delta f$, with a word length of approximately 2,000 bits. This permits a digit by digit comparison for a period of 1 millisecond ($1/\Delta f$) and requires a total search time of approximately 2 seconds to cycle through a complete digit-for-digit comparison of every possible shifted version of the approximately 2,000 bit word.

When, due to this effective sliding of one code past the other in mixer 26, the frequency and phase components of the two codes come into additive relationship, and IF amplifier 42 responds with a signal, through detector 45 and the disabling circuit 46, to discontinue operation of the frequency shifter 38 and cause the local code generator 34 to follow the basic cycle of its central timing clock 36 which corresponds to the frequency of similar clock 16 at the transmitter. In some designs the signal delay through the IF amplifier is such that the pattern generator may have already drifted through synchronism before the frequency shift can be corrected. In this type of circuit it is necessary to introduce a small frequency drift in the correct direction to offset this effect of circuit inertia at the same time the frequency shift is disabled.

Once synchronism has been established the received and locally generated frequency and phase patterns are locked to each other in the correlation mixer 26 through phase shifting, sensing, and correcting circuits operating in the following manner.

A conventional phase modulator 40 inserted between the clock 36 and the code generator 34 introduces a phase shift or jitter to the code pulses at a rate determined by an independent oscillator 43. This circuit may comprise a short delay line with oscillator 30 shifting connections between different delay outputs. In a system employing a one megacycle bit rate, a phase shifting of $\pm 30°$ has been employed to provide a pulse time advance and retardation, or jitter, of approximately 1/10 of a microsecond.

As the time axis of the locally generated code is advanced and retarded by this 1/10 of a microsecond, the two code patterns cycle through precise correlation by a corresponding amount. An effect of these code advancing and retarding time excursions is amplitude variations in the output of IF detector 45. These variations are compared in phase differential detector 44 with a signal from the oscillator 43 which determines the advancing and retarding excursions.

Referring to the correlation curve plotted as FIG. 5, it will be appreciated that as the phase between the two codes varies by one-tenth of a microsecond, the effect at the IF amplitude detector 45 for both advancing and retarding time excursions will be an equal decrease ($5a$) in signal down each side of the correlation curve, provided with phase relationship at the time the jitter is applied is precisely identical. This provides a steady reference signal 5A at the output of phase differential detector 44.

If the phase of one code happens to be in advance of that of the other, the 0.1 microsecond jitter will result in the IF signal retarding to point $5b_1$ on the left hand rise of the curve and advancing through the apex to point $5b_2$ on the right hand slope. This provides a signal of greater amplitude on the forward excursion than during the retard period for a net positive effect, 5B. Similarly, if the phase of the first signal happens to lag the phase of the other signal, the jitter brings the IF output from a relatively high amplitude $5c_1$ on the retard excursion through the apex of the curve and down to the relatively low point $5c_2$ during the advance period. This provides a relatively negative effect, 5C, at the output of phase detector 44.

The output of phase detector 44 is connected to reactance modulator 41 which controls the frequency of clock 36 responsive to phase variations detected by the circuit 44. Thus, a closed loop servo-system is provided for locking the locally generated signal to the received signal in the correlation mixer 26. This arrangement has the significant advantage that it not only compensates for slight frequency and phase variations between the central clocks of the transmitter and the receiver, but also corrects for other variations such as doppler shift due to relative motion between the two, etc. Thus, apparent changes in the transmitter frequency produce equal and corresponding changes in the signal locally generated at the receiver to result in a constant and reliable receiver output.

The signal passed through the IF amplifier 42 is detected and has its message content converted to a suitable output by means of conventional circuits designated at 48. In the particular system described, since the message communicated amplitude modulated the carrier with a keyed tone signal, an appropriate amplitude detector and output circuit responsive to the keyed intelligence will be understood to comprise this portion of the receiver. In similar fashion, the message intelligence may be communicated by appropriate frequency modulation, frequency shifting, and other conventional modulation of either the basic carrier or the frequency dispersing signal. These and other modifications will be apparent to those skilled in the art.

A communication system has been described which features one embodiment of the invention. It is to be understood, however, that the scope of the invention is not limited to such a system or to the particular features and the embodiment described, or to the specific frequencies, circuit designs, values, parameters, etc. suggested, but only by the scope of the following claims.

What is claimed is:

1. In a communication system utilizing at least two independent binary coded pulse signal sequences, means for achieving and holding time synchronism between said two sequences which comprises the combination of pulse recurrence frequency searching means for controlling the pulse recurrence frequency of one of said signals relative to the other to bring said signal into synchronism with the other, and phase locking means including a periodic phase checking circuit and a phase variation correcting circuit responsive to the searching means bringing the signals into synchronism to operate on one of said signals for holding said signals in synchronism.

2. In an electronic signal system, means for synchronizing a first sequence of binary coded signal pulses having a multiple frequency content with a second sequence of similarly coded pulses having a similar frequency content which comprises: for the pulses of said first sequence, a pulse frequency content shifting circuit and a pulse phase shifting circuit; a mixer circuit for comparing the frequency and phase components of the pulses of said first sequence with the pulses of said second sequence; and, first and second control circuits responsive to said comparison for controlling the frequency content and phase respectively of the pulses of said first sequence said first control circuit including means independent of said signal sequences for changing the frequency content of said pulse shifting circuit in discrete increments and means for measuring the effect of said changes and said second control circuit including means independent of said signal sequences for periodically shifting the phase of said pulse shifting circuit and means for measuring the effect of said phase shifting.

3. In an electronic signal system utilizing at least two binary coded pulse sequences, means for achieving and holding correlated synchronism between said sequences which comprises the combination of: means for comparing said sequences; means for changing the pulse recurrence frequency of one of said sequences to search for correlation; and, means responsive to said comparison for adjusting the phase of one of said sequences to maintain correlation.

4. The invention according to claim 3 and wherein said means for changing frequency includes a pulse recurrence frequency control circuit having a search and a basic mode of operation, each characterized by a different output frequency, and means responsive to said code sequence comparison for changing from one mode to another.

5. For a communication system, a self-synchronizing receiver which comprises: means for providing a received binary coded pulse signal sequence; a comparison circuit; means for applying said received signal to said comparison circuit; means for providing a local binary coded pulse signal having frequency and phase components; means for applying said local signal to said comparison circuit; means independent of said received signal for varying the frequency and the phase of said local pulse coded signal; and, means responsive to the output of said comparison circuit for controlling the frequency and phase components of said local pulse code.

6. A radio communication system which comprises: at a transmitter, means for producing an rf carrier signal, pulse code sequence modulating means for binary pulse code modulating said signal; and, at a receiver, means for intercepting said carrier signal, means for providing a local rf signal, pulse code sequence providing means for binary pulse code modulating said local signal, means for comparing said intercepted and locally modulated signals in in a common mixer circuit, and frequency sensitive means for synchronizing the period of said coded intercepted and local signals, said frequency sensitive means including means for gradually changing the pulse recurrence frequency of said local pulse code signal sequence, means for detecting maximum correlation between the modulation frequency of said intercepted and locally generated signals and means for periodically shifting the relative phase of said received and locally generated signal sequences into and out of correlation and controlling the operation of said means for changing the pulse recurrence frequency of said local pulse code signal sequence by feed-back connection from said shifting means.

7. A communication system which comprises: at a transmitting station, means for generating an rf signal, means for providing a sequence of pulses, means for modulating said rf signal with said pulse sequence, and means for transmitting said modulated signal; and, at a receiving station, means for intercepting said modulated signal, means for generating a local rf signal, means including a periodic timing circuit for providing a local sequence of pulses, means for modulating said local rf signal with said local pulse sequence, a common mixer circuit connected to said intercepting and said local modulating means, an IF amplifying and detecting circuit connected to said mixer circuit, a pulse frequency control circuit for varying the frequency of said local pulse sequence, means responsive to the output of said IF detection circuit for controlling the operation of said frequency control circuit, a phase control circuit for shifting the phase of said local pulse sequence, means responsive to the output of said IF detection circuit for measuring the effect of said phase shifting, and means responsive to said measuring for adjusting the period of said timing circuit.

8. A carrier dispersal communication system which comprises: at a transmitting station, means for generating an rf carrier signal, a first pulse shifting register with regenerative feed-back connections for providing a sequence of pulses, means for modulating said rf signal with said pulse sequence to disperse the energy of said carrier over a relatively broad rf spectrum, means for pulsing said modulated signal further to disperse said energy, and means for transmitting said modulated signal; and, at a receiving station, means for intercepting said transmitted signal, means for generating a local rf signal, means including a periodic timing circuit and a second pulse shifting register with regenerative feed-back connections for providing a local sequence of pulses identical to the sequence at the transmitter, means for modulating said local rf signal with said local pulse sequence, means for pulsing said signal so modulated similarly to the pulsing of the modulated signal at the transmitter, a common mixer circuit, means for connecting said intercepted signal and modulated and pulsed local signal to said mixer circuit, an IF amplifying and detecting circuit connected to said mixer, a pulse frequency control circuit for varying the frequency of said local pulse sequence, means responsive to the output of said IF detection circuit for controlling the operation of said frequency control circuit, a phase control circuit for shifting the phase of said local pulse sequence, means responsive to the output of said IF detection circuit for measuring the effect of said phase shifting, and means responsive to said measuring for adjusting the phase of said local pulse sequence.

9. A carrier dispersal communication system which comprises: at a transmitting station, means for generating an rf carrier signal, first means for modulating said carrier with message intelligence, means including a first pulse shifting register with regenerative feed-back connections for providing a sequence of pulses, second means for modulating said carrier with said pulse sequence to disperse the energy of said carrier over a relatively broad rf spectrum, means for pulsing said modulated signal further to disperse said energy, and means for transmitting said modulated signal; and, at a receiving station, means for intercepting said modulated signal, means for generating a local rf signal, means including a periodic timing circuit and a second pulse shifting register with regenerative feed-back connections for providing a local sequence of pulses identical to the sequence at the transmitter, means for modulating said local rf signal with said local pulse sequence, means for pulsing said local signal so modulated similarly to the pulsing of the modulated signal at the transmitter, a mixer circuit, means connecting said intercepted signal and said modulated and pulsed local signal to said mixer circuit, an IF amplifying circuit connected to said mixer, a pulse frequency control circuit for varying the frequency of said local pulse sequence, means responsive to the output of said IF circuit for controlling the operation of said frequency control circuit, a phase control circuit for shifting the phase of said local pulse sequence, means responsive to the output of said IF detection circuit for measuring the effect of said phase shifting, means responsive to said measuring circuit for adjusting the phase of said local pulse sequence, and means connected to said IF amplifying circuit for detecting said message intelligence.

10. For a communication system employing a binary code pulsed carrier, a self-synchronizing receiver which comprises: an rf energy reception circuit, a mixer circuit connected to said reception circuit; an IF amplifying circuit connected to said mixer; a local oscillator; a local binary code pulse generator; a modulator; means connecting said local oscillator and pulse generator to said modulator; means connecting the output of said modulator to said mixer; a source of timing pulses for controlling the pulse recurrence frequency of the output of said pulse generator; a frequency shifting circuit for effecting a change in the frequency of said pulses independently of the frequency content of said received energy; an IF signal amplitude detector connected to said IF amplifier; a frequency control circuit for controlling the operation of said frequency shifting circuit responsive to the output of said IF amplitude detector; and, means responsive to the output signal of said IF amplifier for further adjusting the frequency of said modulating pulses.

11. For a communication system employing a binary code pulsed carrier, a self-synchronizing receiver which comprises: an rf energy reception circuit; a mixer circuit connected to said reception circuit; an IF amplifying circuit connected to said mixer; a local oscillator; a local binary code pulse generator; a modulator; means connecting said local oscillator and pulse generator to said modulator; means connecting the output of said modulator to said mixer; a source of timing pulses for controlling the pulse recurrence frequency of the output of said pulse generator; frequency shifting means responsive to the output of said IF amplifier for synchronizing said local pulse code with said received pulse code; a phase shift circuit adapted to change periodically the phase timing of the output of said pulse generator; a phase sensitive circuit for detecting the effect of said phase changes on the output of said IF amplifier; and, a control circuit for adjusting the output of said timing pulse source responsive to signals from said phase sensitive circuit.

12. A dispersed carrier communication system which comprises: a transmitter including an rf generator, a pulse generator including a pulse shifting register with regeneration feed-back connections, a message modulating circuit, a balanced modulator, means modulating the output of said rf generator with the output of said pulse generator in said balanced modulator to disperse said rf energy over a broad band of the frequency spectrum, and means for transmitting said energy so modulated and dispersed; and, a receiver including an rf reception circuit to receive said transmitted energy, a mixer circuit connected to said rf reception circuit, a tuned IF amplifying circuit connected to the output of said mixer circuit, a local rf generator having an output signal frequency which is removed from the output frequency of the rf generator in said transmitter by the frequency to which said IF amplifying circuit is tuned, a local pulse generator including a pulse shifting register with regenerative feed-back connections for providing the same pulse sequence as that provided by the corresponding pulse generator in the transmitter, a balanced modulator, means connecting the output signals from said local rf and pulse code generators to said modulator whereby the rf energy of said local generator is dispersed in a pattern having substantially identical frequency and phase components with those of the transmitted signal, means connecting the output of said local balanced modulator to said mixer, a local source of timing pulses for controlling the signal frequency of said local code generator, a frequency shifting circuit for changing the frequency of the pulses from said timing source as applied to said code generator, an amplitude detector connected to said IF amplifier, a frequency control circuit for controlling the operation of said frequency shifting circuit responsive to the output of said IF amplitude detector, a phase shift circuit adapted to change periodically the phase timing of the output of said local pulse generator, a phase sensitive circuit for detecting the effect of said phase changes on the output of said IF amplifier, a control circuit for adjusting the output of said timing pulse source in response to signals from said phase sensitive circuit, and means for detecting the message modulation from the output of said IF amplifier.

* * * * *